United States Patent [19]
Winters

[11] 3,793,965
[45] Feb. 26, 1974

[54] ACCUMULATING LOAD TROLLEY AND CONVEYOR SYSTEM

[75] Inventor: Raymond Lewis Winters, Abilene, Kans.

[73] Assignee: The Ehrsam Company, Abilene, Kans.

[22] Filed: Aug. 17, 1972

[21] Appl. No.: 281,589

[52] U.S. Cl.............................. 104/172 S, 104/96
[51] Int. Cl............................................. F04b 3/00
[58] Field of Search........................... 104/172 S, 96

[56] References Cited
UNITED STATES PATENTS
3,664,267  5/1972  Di Rosa.............................. 104/96

FOREIGN PATENTS OR APPLICATIONS
902,651  8/1962  Great Britain.................. 104/172 S

*Primary Examiner*—Trygve M. Blix
*Attorney, Agent, or Firm*—Stephen A. Schneeberger

[57] ABSTRACT

A conveyor system of the power-and-free type having an accumulation capability is provided. A trolley track extends in juxtaposition with an endless driving means and the relative spacing therebetween is varied to provide a drive region and an accumulation region. A load trolley for use in the system includes a first drive member having an unyieldable drive position relative to the trolley for driving engagement with the driving means and a second drive member having a yieldable drive position relative to the trolley. The relative positions of the first and second trolley drive members and the system driving means are such that the driving means drivingly contacts at least the unyieldable first drive member along the driving region of the trolley track and contacts only the second yieldable drive member along the accumulation region of the trolley track. The yieldable drive member is preferably a spring biased dog. Stop means selectively interposable in the trolley path at the accumulation region prevent advancement of the load trolley and the yieldable drive member yields to the increased force of the driving means to permit its passage relative thereto.

20 Claims, 3 Drawing Figures

ACCUMULATING LOAD TROLLEY AND CONVEYOR SYSTEM

BACKGROUND OF THE INVENTION

The invention relates generally to conveyor systems and more particularly to conveyor systems providing an accumulating region for storage. More particularly still, the invention relates to a power-and-free conveyor system and a load trolley used therein capable of providing accumulation and live storage of the load trolley.

In overhead power-and-free conveyor systems, an endless driving means extends along a trolley track in juxtaposition therewith for driving engagement with a load trolley supported on the trolley track. Engagement of the driving means with the load trolley is normally continuous; however, it may be desirable, from time to time, to accumulate a plurality of loads at a work station and prevent their further advancement for some period of time. While stopping of the driving means would accomplish this function for a single load trolley, it would prevent the accumulation of a plurality of load trolleys and therefore usually be unsatisfactory. In order to continue advancement of subsequent load trolleys to the accumulating region, it is generally desirable that the driving means be in continuous operation, thus requiring that the load trolley and the driving means be disengaged from one another in some manner.

In most prior art conveyor systems having the above-mentioned accumulating capability, a dog member associated with the load trolley and adapted for driving engagement with a dog member of the driving means is constructed such that it may be withdrawn from the path of the driving dog by means of a stop actuated lever associated with the load trolley. In such systems a probe or lever arm extends forward from the trolley and is capable of withdrawing the trolley dog from engagement with the driving means when it contacts and is actuated by a stop device interposed in its path. Generally, the trolley dog is spring biased to its drive position and actuation of the lever arm by contact with the stop device serves to overcome the spring bias and positively withdraw the trolley dog toward the trolley.

However, the dog-withdrawing lever arm described above must be precisely positioned relative to the stop device to insure accurate contact therewith for resulting actuation of the lever arm. Additionally, each load trolley must be equipped with a member simulating the above-described stop device extending rearward therefrom to actuate the forward extending lever arm of the next load trolley entering the accumulation region. It will be evident that the opportunity for misalignment between a stop device and dog-withdrawing lever arm may be significant. If actuation of the lever arm fails to occur, the trolley dog is not withdrawn and damage may occur to a stop device, the load trolleys and/or the driving means. Efforts to prevent such problems have resulted in trolley dog-withdrawing mechanisms which are often large and require precise manufacturing, greatly adding to their cost.

SUMMARY OF THE INVENTION

According to the present invention there is provided a conveyor system comprising an endless driving means extending along a trolley track in juxtaposition therewith. The spacing between the driving means and the trolley track is of a first distance along the region of the trolley track at which the trolleys are to be normally driven without accumulation and a second greater distance along the region of the trolley track at which the trolleys are to be stopped and accumulated.

Further, according to the invention, a load trolley is provided which includes a first drive member mounted thereon and having an unyieldable drive position relative to the trolley and a second drive member mounted thereon and having a yieldable drive position relative to said trolley. The relative positions of the first and second trolley drive members and the system driving means are such that the driving means drivingly contacts at least the unyieldable first drive member along the driving region of the trolley track and contacts only the second yieldable drive member along the accumulating region of the trolley track. The drive member having the yieldable drive position is preferably a dog member spring biased to a driving position, the biasing force of the spring being overcome by a predetermined force applied to the drive member by the driving means whereby the drive member yields relative to the trolley and the driving means. Stop means are interposable in the path of the load trolley at the accumulation region or station to prevent advancement of the load trolley. The resulting increase in force applied by the driving means to the yieldable drive member equals or exceeds that required to cause said member to yield, permitting passage of the drive means thereby.

DESCRIPTION OF THE PREFERRED EMBODIMENT

Figure 1:
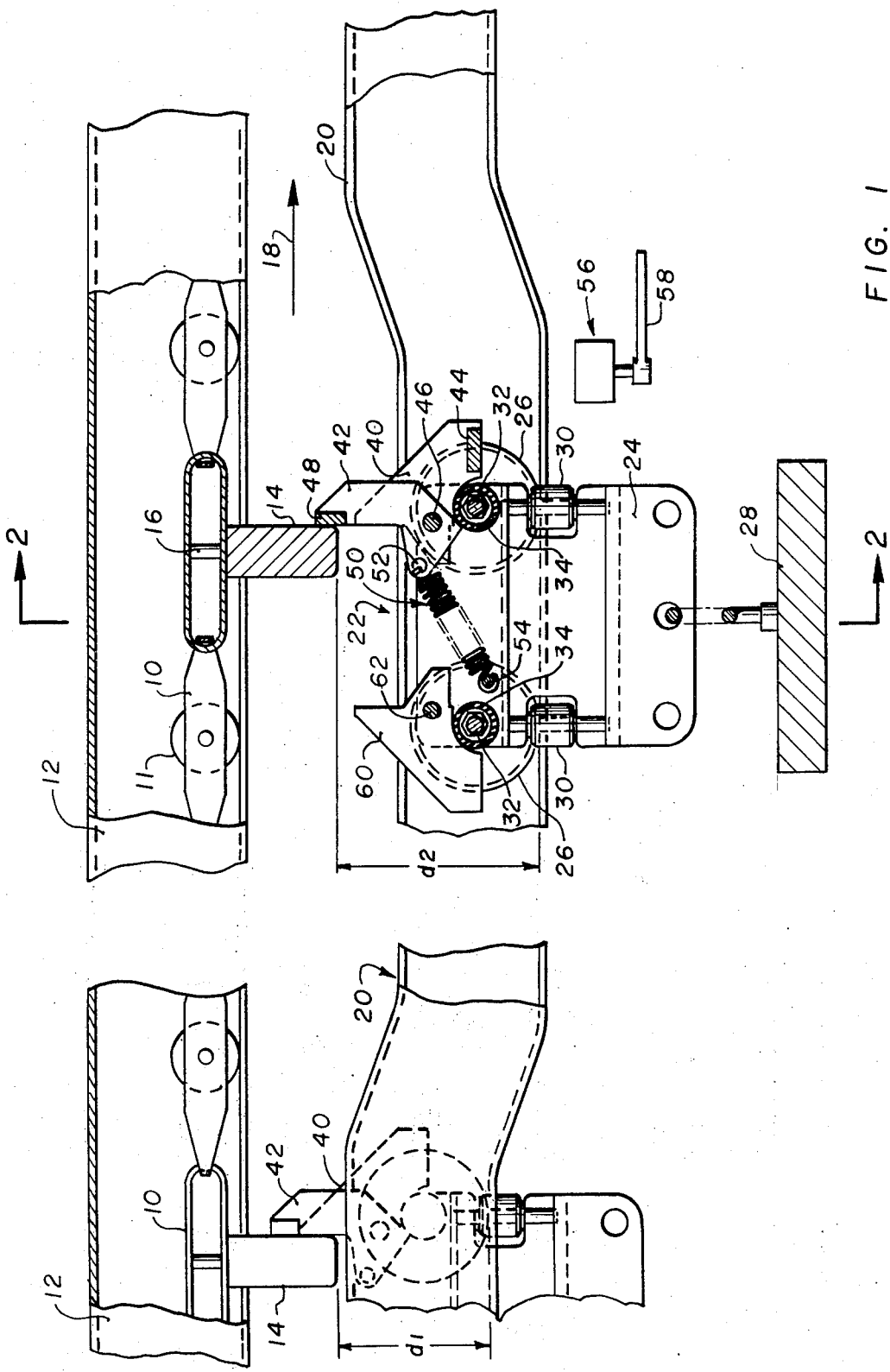
FIG. 1 shows a small portion of a conveyor system including a load trolley of the invention shown at the drive and accumulation regions of the system and showing elevational detail of the trolley in a cutaway sectional view at the accumulating region.

Referring now to FIG. 1, there is shown a portion of an overhead power-and-free type of conveyor system. The system includes powered endless driving means, such as endless chain 10 having driving members such as pusher dog 14 extending downwardly therefrom at spaced locations and carried thereby. Endless chain 10 may be supported by wheels 11 which are in turn supported by chain track 12. Chain track 12, without chain 10, is seen more clearly in FIG. 2. Pusher dog 14 may be rigidly secured to chain 10 as by pins 16 or may be carried thereby in other manners, one of which is shown in U. S. Pat. No. 3,257,963 to D. M. King. The direction of travel of chain 10 and associated pusher dog 14 is indicated by arrow 18. Trolley supporting and guiding means such as trolley track 20 extend below chain track 12 substantially parallel thereto along most of its length and in vertical alignment therewith. Trolley track 20 in the present embodiment comprises a pair of opposed channel members sized and spaced to accommodate and support a load trolley 22 therewithin. Trolley track 20, and more particularly the trolley supporting surface thereof, is spaced a first distance $d_1$ below pusher dog 14 along one region of the conveyor system and is spaced a second greater distance $d_2$ below dog 14 along another region of the conveyor system. Spacing $d_1$ of track 20 occurs throughout the conveyor system at the drive regions where positive driving of load trolley 22 is intended with no provision for disengaging pusher dog 14 from the load trolley. Spacing $d_2$ of track 2 occurs in that, or those, regions of the conveyor system in which it is desired to stop load trolley 22 and permit relative motion of pusher dog 14 therepast according to the invention. Such latter region may be referred to as an accumulating or storing region or station and will be of sufficient track length to accommodate a plurality of load trolleys 22 accumulated therealong. In one embodiment, $d_2$ is 5/8 inch greater than $d_1$. In the present embodiment, chain track 12 is substantially linear through those points at which trolley track 20 spacing changes between $d_1$ and $d_2$ and the spacing change is effected by ramps or inclines in the trolley track. It will be appreciated that the spacing change might be effected by reversing this arrangement of including moderate inclines in both.

Accumulating load trolley 22 is adapted to be propelled by means of pusher dog 14 on drive chain 10 along trolley track 20 in the direction 18. Trolley 22 includes a structural framework or body 24 having wheels 26 mounted thereto for rolling support thereof by trolley track 20. Trolley body 24 may be a pair of rigid plate members joined to one another as by welding, and being spaced apart in the upper portion and including a lower portion adapted for engagement of a load 28 therewith. Rollers 30 may be affixed to frame 24 and positioned to maintain lateral alignment of trolley 22 relative to track 20. Shafts 32 extend between the spaced apart upper plate members in the upper portion of trolley body 24 near the front and rear ends thereof. Shafts 32 include regions of polygonal cross-section in mating engagement with correspondingly polygonally shaped holes in the plate members of body 24, preventing rotation of shafts 32 relative to said body. The ends of shafts 32 extend outwardly beyond the plate members of body 24 and have wheels 26 mounted thereto, as by a retaining rivet engaging shaft 32, to allow rolling transport of trolley 22. A bushing 34 surrounds each shaft 32 and extends between the inner surfaces of the plate members of trolley body 24 and serves to maintain a constant spacing between said surfaces. Bushing 34 is preferably of a resilient shock and sound absorbing material such as polyurethane or nylon for reasons to become evident below.

In this embodiment, the dogs or abutments utilized for drivingly engaging load trolley 22 with pusher dog 14, to drive the trolley, are mounted to body member 24 near its upper forward end and, according to the invention, comprise two discrete dog members. Front retaining dog 40 provides a nonyielding drive surface for contact with pusher dog 14 along the conveyor system drive region. Accumulating dog 42 is capable of operation separately from retaining dog 40 and has a yieldable drive position allowing it to drivingly engage pusher dog 14 in the accumulating region of the system and to yield to the force of pusher dog 14 when trolley 22 is stopped, permitting dog 14 to pass.

Figure 2:
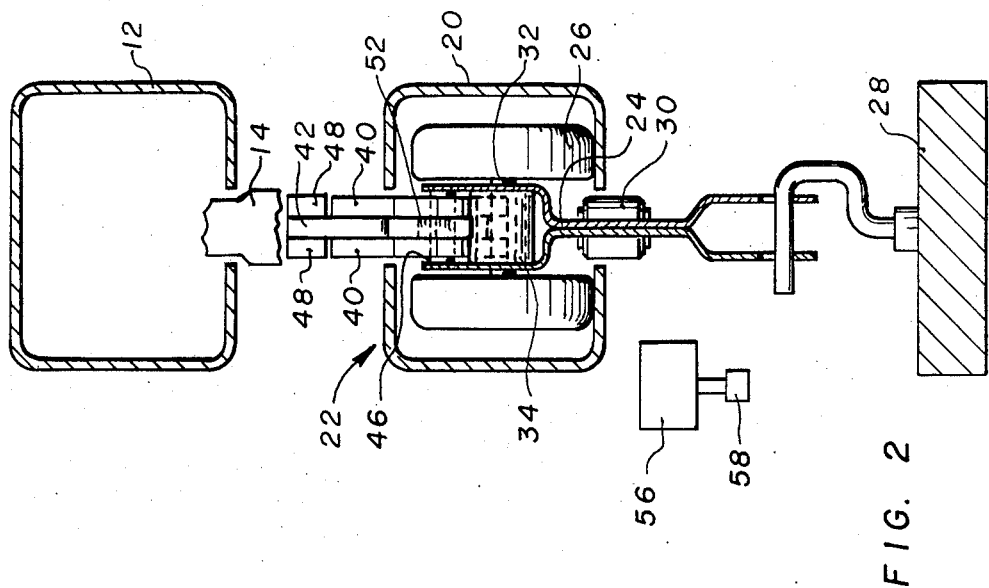
FIG. 2 is an elevational view of the load trolley shown in FIG. 1 of the invention taken approximately along line 2—2 of FIG. 1.

As seen in FIG. 1, and more clearly in FIG. 2, front retaining dog 40 comprises a pair of rigid members, such as metal stampings, laterally spaced from one another in parallel relationship and joined by means of connecting member 44 extending therebetween and rigidly affixed thereto. Retaining dog 40 is pivotably mounted about a pin or shaft 46 which extends transversely of travel arrow 18 generally horizontally between and supported by the plate members of body 24, in the upper forward portion thereof. Retaining dog 40 is mounted to permit rearward or counterclockwise rotation of the dog in the event of a rearwardly directed force contacting the upper front surface thereof, but it is gravity biased in contact with front bushing 34 to limit forward or clockwise rotation. In this position of dog 40 against bushing 34, its spaced plate members present a nonyielding rearward facing drive surface which extends substantially vertically upward from trolley body 24. Front retaining dog 40 is of such height in its drive position that pusher dog 14 easily contacts the drive surface thereof when the trolley track-to-pusher dog spacing is $d_1$, but terminates below pusher dog 14 for trolley track-to-pusher dog spacing $d_2$ to prevent driving contact of pusher dog 14 therewith.

Referring to FIGS. 1 and 2, an accumulating drive member such as dog 42 is pivotally mounted on shaft 46 in the space occurring between the spaced-apart plate members of front retaining dog 40. The lateral spacing between dog member 42 and the plate members of dog 40 is fairly close, but sufficient to permit free pivotable motion of one relative to the other. In this embodiment, dog 42 is preferably a rigid plate member of the same material as that used in dogs 36 and 40. Dog 42 is so shaped relative to its pivotable axis about shaft 46 that it may pivot or rotate forwardly, or clockwise, but is limited in rearward or counterclockwise rotation by its contact with the bushing 34 at the front of the trolley. Dog 42 is spring biased to the position in contact with bushing 34 as will be described in greater detail below. In this stop limited position, dog 42 presents a rearward facing drive surface which extends substantially vertically upward from trolley body 24. Further, the drive surface is preferably vertically coplanar with that of front dog 40. The drive surface portion of dog 42 extends upward from trolley 22 beyond the drive surface of dog 40 a sufficient distance, for instance, 1/2 inch, to permit engagement of dog 42 with pusher dog 14 when the increased trolley track-to-pusher dog spacing $d_2$ exists. It is preferable that the drive surface of pusher dog 42 additionally include a portion which is coplanar with that of dog 40 and is vertically coextensive with at least a portion thereof. This will provide a drive surface which is substantially continuous laterally from one plate member of dog 40 to the other to permit pusher dog 14 free lateral sliding motion across the drive surfaces provided by the front trolley dogs. In furtherence of such design, laterally extending tabs 48 of a durable material similar to that of dog member 42 are affixed to the dog at or near the upper end thereof and in coplanar relationship with the driving surface thereof, thus also laterally extending the drive surface of dog 42 above dog 40.

Pusher dog 42 is biased to its drive position by spring 50. One end of spring 50 is connected or anchored to dog 42, as by hooking the spring end in hole 52 and the other end of the spring is anchored to trolley body 24, as by anchoring it about pin 54 extending between the spaced-apart plates of the trolley body at a point preferably behind and below the location of anchor hole 52 when dog 42 is in its drive position. Spring 50 is sized such that dog 42 is held in its drive position against the driving forces of pusher dog 14 occurring when trolley 22 is fully loaded and otherwise free to travel trolley track 20. This would include sufficient retentive force by spring 50 to maintain accumulating dog 42 in its drive position when trolley 22 is fully loaded and is transiting any upwardly inclined trolley track surfaces within the accumulation region of the conveyor system. In general, the accumulating trolley hereindescribed is intended for use with loads of less than several hundred pounds.

Trolley stopping means, such as stop device 56, are supported in a manner not forming part of the invention and are disposed near the downstream end of the accumulating region of trolley track 20 relative to the direction of travel 18. Stop device 56 may be any of a variety of devices well known in the art having an arm 58 or similar structure which is selectively interposable in the path of travel of trolley 22. Arm 58 is typically electrically or fluidly actuated from a "trolley passing position" seen in FIG. 1 to a "trolley stopping position" seen in FIG. 3. Arm 58, in the trolley stopping position, will contact some portion of an oncoming trolley 22 and prevent the trolley from passing therebeyond.

Figure 3:
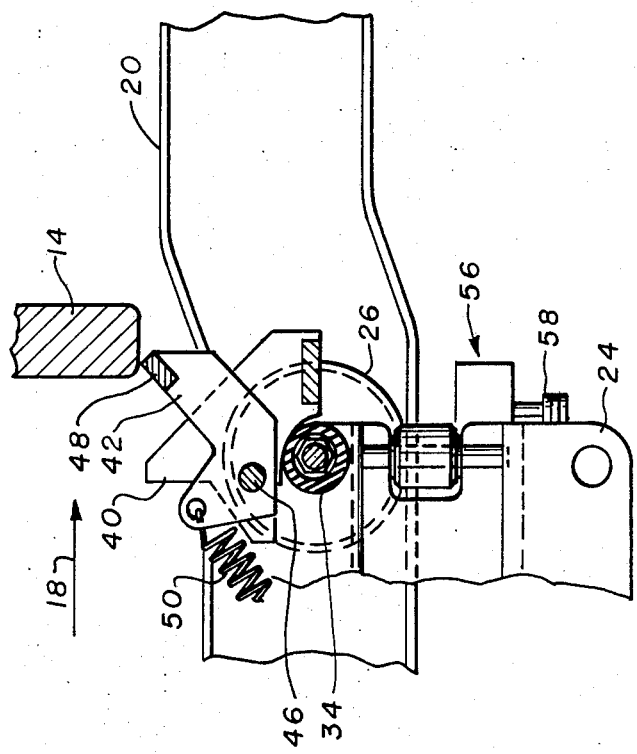
FIG. 3 is similar to that of FIG. 1 and shows the accumulating load trolley in contact with the trolley stop device in the accumulating region.

When arm 58 of stop device 56 is in the trolley stopping position, and trolley 22 is in halted engagement therewith, as seen in FIG. 3, the net driving force applied to accumulating dog 42 by pusher dog 14 increases significantly and spring 50 is sized to allow dog 42 to yield to such force and to pivot sufficiently forward and downward to permit pusher dog 14 to pass thereover in continued travel, as seen in FIG. 3.

In addition to dogs 40 and 42 positioned near the front of trolley 22 and utilized for drivingly engaging pusher dog 14, a rear retaining dog 60 may also be mounted near the upper rear end of trolley body 24 to prevent runaway or escape of trolley 22 from pusher-dog 14 when trolley track 20 is inclined downward steeply relative to the forward speed of the pusher dog. Rear retaining dog 60 is generally similar to front retaining dog 40 in side elevational view. However, unlike front retaining dog 40 which includes an intermediate space occupied by accumulating dog 42, rear retaining dog 60 is substantially continuous laterally thereacross.

Typically, rear retaining dog 60 is comprised of several identically shaped metal stampings affixed closely adjacent one another as by welding. Rear retaining dog 60 is pivotably mounted about shaft or pin 62 which extends substantially horizontally between and is supported by the spaced plate member of body 24 near the upper rear end thereof. Dog 60 is mounted to allow forward or clockwise rotation about pin 62 when contacted from the rear by pusher dog 14 at such time as trolley 22 is being initially engaged with the pusher dog. Dog 60 is gravity biased in contact with rear bushing 34 to limit its rearward or counterclockwise pivotal rotation. In this biased position of dog 60 against rear bushing 34, it presents a nonyielding, forward facing, laterally continuous contact surface extending substantially vertically upward from trolley body 24, similar to but in opposed relationship to front dog 40. The height of the contact surface of rear dog 60 may be essentially the same as that of the drive surface of front retainer dog 40 as long as trolley track 20, in the accumulation region of the conveyor system, does not incline downwardly at an angle sufficiently steep to allow forward escape of the trolley 22 from pusher dog 14. If it is necessary or desirable to have a downwardly inclined trolley track section in this region exceeding the slope limit, rear retaining dog 60 may extend upwardly from trolley 22 a distance comparable to that of accumulating dog 42, thereby insuring that the trolley will be retained against escaping from pusher dog 14 in both the drive and the accumulation regions of the conveyor system, regardless of downward inclines in the trolley track.

In operation, the load trolley 22 of the accumulating conveyor system of the invention is propelled by engagement of pusher dog 14 with the drive surfaces of both dogs 40 and 42 along the drive regions of the system at which the trolley track-to-pusher dog spacing is $d_1$, seen in the lefthand side of FIG. 1. In the regions of the conveyor system in which load trolleys 22 are to be accumulated such that their loads 28 might be stored or in some way manipulated, the trolley track-to-pusher dog spacing is increased to $d_2$. This spaces nonyielding dog 40 below the zone of possible contact with pusher dog 14 and continued propulsion of load trolley 22 is provided by contact of the pusher dog with the upper drive surface of accumulating dog 42. In the event that a trolley 22 is to transit the accumulating region without stopping for accumulation, arm 58 of stop device 56 remains in its trolley passing position and continued driving engagement between pusher dog 14 and accumulating dog 42 propels the load trolley through the accumulating region to a subsequent drive region.

If it is desired to stop a load trolley 22 in the accumulation region, and possible accumulate others therebehind, arm 58 is interposed in the travel path of the trolley, thereby stopping it. Dog 42 yields in a ratchet-like manner to the increased force resulting from its immediate driving pusher dog 14 and each subsequent pusher dog, thereby permitting continued motion of chain 10. Chain 10 continues to drivingly propel subsequent trolleys 22 within the drive region and these trolleys will, in turn, be sequentially accumulated one behind another upon reaching the conveyor system accumulating region. It may be necessary, due to the size and geometry of the loads 28 to provide a contact arm, not shown, extending forwardly or rearwardly from trolley 22 to stop the next subsequent trolley before their loads 28 may contact one another. It will be appreciated that any such contact arm will not require the precise positioning required by the dog-withdrawing lever arm of prior art accumulating trolleys.

Trolley track 20, throughout all or most of the accumulation region of the conveyor system, extends preferably horizontally or may be provided with a shallow downward incline in the direction of chain travel indicated by arrow 18. Such downward incline may be desirable to prevent recoiling or rebounding of the last trolley 22 in an accumulated line of trolleys each time its accumulating dog 42 recovers from yielding to an advancing pusher dog 14. Further, pendulum-like oscillations of load 28 may tend to cause rebounding of the last trolley accumulated as it is initially stopped and the above-mentioned track incline will reduce or eliminate any significant rearward travel of the trolley in this region. Further to this end, forwardly ratcheting, anti-reverse stop means may be associated with trolley track 20 at a position, or positions, rearwardly of stop device 56 to limit any rearward travel of a trolley previously stopped for accumulation.

While the load trolley of the preferred embodiment of the invention has been described as having an accumulating dog which is a rigid member pivotably mounted and spring biased to permit it to pivotably yield to certain forces, the accumulating dog might comprise another form of lever device which is spring biased to its drive position. One example would be a leaf spring mounted at its lower end to the body of the load trolley and extending upwardly therefrom to provide the yieldable drive surface required by the invention. Further, while the system has been described as comprising an over and under chain and trolley track arrangement, it will be appreciated that this spacial geometry may be varied an might include a side-by-side arrangement in which spacings $d_1$ and $d_2$ extended horizontally rather than vertically and the trolley drive dogs, both yieldable and nonyieldable, would extend horizontally outward from the trolley.

It will be understood that the embodiment shown and described herein is merely illustrative and that changes may be made without departing from the scope of the invention as claimed.

What is claimed is:

1. A trolley comprising in combination, a frame, means for mounting said frame for travel along a track, a first dog member extending from said frame for drive engagement with a suitable driving means for moving said trolley in a particular direction, said first dog member being unyieldable relative to said frame in said particular direction of trolley movement and a second dog member extending from said frame to allow drive engagement therewith by said driving means independently of said first dog member for moving said trolley in said particular direction, said second dog member being yieldable to permit passage of said driving means relative thereto only on the application of a predetermined force of said driving means.

2. The trolley of claim 1 wherein said second dog member has at least a portion disposed outward of said first mentioned dog to form a drive surface thereof.

3. A trolley comprising in combination, a frame, wheel members mounted on said frame, a first drive member having a fixed drive position for transmitting driving force to said trolley in a particular direction and a second drive member also having a drive position for transmitting a driving force to said trolley in the same said particular direction and being yieldable with relation thereto upon the application of a predetermined force.

4. The trolley of claim 3 wherein said two drive members have coplanar drive surfaces.

5. The trolley of claim 4 wherein said yieldable drive member comprises a lever device spring biased to its drive position.

6. The trolley of claim 5 wherein said yieldable drive member comprises a pivotably mounted dog member, a dog stop member mounted on said frame and spring means acting between said frame and said dog member for biasing said dog member to its drive position against said dog stop member.

7. The trolley of claim 6 wherein the dog contacting surface of said stop member is a resilient force absorbing material.

8. The trolley of claim 4 wherein said first mentioned drive member includes a pair of parallel spaced plate members and said second drive member is mounted intermediate said plate members.

9. The trolley of claim 8 wherein said yieldable drive member comprises a lever device spring biased to its drive position.

10. The trolley of claim 9 wherein the drive surface of said second drive member extends outward of the drive surface of said pair of parallel plate members.

11. A conveyor system comprising in combination:
   a. trolley track means;
   b. a load trolley supported by and adapted to move along said trolley track means in a predetermined path, said trolley including first dog means mounted thereon and having an unyieldable drive position and second dog means mounted thereon and having a drive position yieldable with relation to said trolley upon application of a predetermined driving force thereto;
   c. a driving means adapted for movement along a path substantially parallel said trolley track along first and second regions thereof and including a pusher dog extending therefrom, said driving means being spaced from said trolley track a first distance along said first region thereof to permit driving contact between said pusher dog and said first trolley dog means and being spaced a second distance therefrom along said second region thereof to permit contact between said pusher dog and only said second trolley dog means; and
   d. stop means interposable in the path of said trolley in said second region for applying a force to said trolley in a direction opposite the direction of travel of said driving means and of a magnitude as great as said predetermined force, whereby said second dog means drive position yields, said pusher dog may move relative thereto and said trolley is prevented from advancing.

12. A conveyor system comprising in combination:
   a. an endless driving means including dog members extending therefrom and spaced therealong;
   b. a trolley track means juxtaposed to said endless drive means and having at least one accumulating station spaced further from said drive means than the regions immediately before and after said station; and
   c. a trolley mounted on said track means and including a first drive member having an unyieldable drive position and a second drive member having a yieldable drive position, said first member engaging said driving dog when said trolley is in a position on the track other than the accumulating station and said first member being free of said driving dog at said accumulating station, said second member engaging said driving dog at said accumulating station.

13. The conveyor system of claim 12 wherein said drive position of said second drive member is yieldable relative to said trolley upon the application of a predetermined force applied thereto by said driving dog and further including trolley stop means interposable in the path of said trolley at said accumulating station for opposing the advance of said trolley such that said predetermined force is applied to said second drive member by said driving dog, whereby said second drive member drive position yields, said driving dog may advance relative thereto and said trolley is prevented from advancing.

14. The conveyor system of claim 13 wherein said second drive member comprises a lever device spring biased to its drive position.

15. The conveyor system of claim 14 wherein said trolley includes a frame and said second drive member comprises a pivotably mounted dog member, a dog stop member mounted on said frame and spring means acting between said frame and said trolley dog member for biasing the latter to its drive position in contact with said dog stop member.

16. The conveyor system of claim 14 wherein said first and second drive members have drive surfaces coplanar with one another.

17. The conveyor system of claim 16 wherein said driving means is positioned above said trolley, said driving dog members depending therefrom and the drive surface of said second drive member extends upwardly from said trolley beyond the drive surface of said first drive member.

18. The conveyor system of claim 17 wherein a portion of the driving surface of said second drive member is vertically coextensive with a portion of the drive surface of said first drive member whereby said driving dog may simultaneously contact the drive surfaces of said first and second drive members in positions along said track other than said accumulating station.

19. The conveyor system of claim 13 wherein said trolley track means is inclined downwardly in the direction of travel of said driving means along that length of said accumulating station rearward of said trolley stop means.

20. The conveyor system of claim 19 wherein said trolley further includes a retaining member spaced rearwardly of said first and second drive members thereon and having a trolley retaining position for nonyieldably contacting a particular driving dog member to limit the forward movement of said trolley relative to said dog member.

* * * * *